United States Patent Office 3,634,522
Patented Jan. 11, 1972

3,634,522
SEPARATION OF ETHERS
Russell G. Smith, Edmonton, Alberta, Canada, and Alan Vanterpool, Morristown, N.J., assignors to Chemcell, Limited, Montreal, Quebec, Canada
No Drawing. Application Sept. 22, 1967, Ser. No. 669,728, which is a continuation-in-part of application Ser. No. 416,601, Dec. 7, 1964. Divided and this application Aug. 13, 1969, Ser. No. 862,575
Int. Cl. C07c 41/12
U.S. Cl. 260—615 R                                 1 Claim

ABSTRACT OF THE DISCLOSURE

In producing ether derivatives of alcohols, including polyols and more particularly polyols having a quaternary carbon atoms bonded to at least three methylol groups, by reacting the corresponding alkali metal alcoholate with an organic chloride selected from the group consisting of aliphatic chlorides and phenyl substituted aliphatic chlorides in which the chloride moiety is attached to a methylene group and including especially $\beta,\gamma$-unsaturated alkenyl chlorides, the reaction rate is accelerated, fully etherified derivatives of polyol reactants are produced if desired, and a preliminary step in which a pre-formed alkali metal alcoholate of the alcohol is formed is dispensed with, by conducting the etherification reaction in a liquid medium comprising an aliphatic dihydrocarbyl sulfoxide, especially dimethyl sulfoxide. When a blend containing partially etherified polyhydric alcohols is obtained, the components may be separated and recovered by dissolving the blend in a hydrocarbon solvent and then extracting the solution with dimethyl sulfoxide which preferentially dissolves the less-etherified portion of the product.

This is a division of application Ser. No. 669,728, filed Sept. 22, 1967 and now abandoned, which in turn is a continuation-in-part of patent application Ser. No. 416,601, filed Dec. 7, 1964 and now abandoned and assigned to the same assignee as the present application.

This invention relates to the manufacture of ethers, including ethers of polyhydric alcohols, particularly polyhydric alcohols having a quaternary carbon atom bonded to at least three methylol groups. More particularly it relates to an improvement in processes wherein an alcohol is converted to its alkali metal alcoholate derivative which is then reacted with a chlorinated organic compound to form an ether comprising the alcohol etherified with the organic compound, producing an alkali metal chloride as a by-product.

The reaction of alkali metal alcoholates with organic chlorides to form ethers is known, but it has been difficult to carry out this reaction expeditiously and efficiently, particularly when substantial yields are desired of the fully etherified derivative of a polyhydric alcohol (i.e. an etherified derivative in which all the hydroxyl groups of the polyhydric alcohol are etherified). For example, United States Patent 2,924,621, to Krey and Raichle, of February 9, 1960, shows that even when an excess of the chloride is used the fully etherified product is not formed. Likewise, even in etherifying monohydric alcohols, it has heretofore been necessary either to employ a pre-formed alkali metal alcoholate of the alcohol and conduct the reaction in a substantially anhydrous medium, or else to employ long reaction times and obtain relatively low yields of the desired product.

It is therefore one object of this invention to provide a new method of carrying out etherification of polyhydric alcohols which is capable of producing substantial yields of fully etherified products in relatively short reaction times and under relatively mild conditions and without requiring the use of a pre-formed alkali metal alcoholate.

Another object of this invention is the provision of a novel process for effecting a synthtesis of ethers which is effective, rapid and efficient even when the reaction mixture contains water.

Another object of this invention is the provision of a novel process for manufacturing pentaerythritol ethers.

Still another object is to provide a method for separating partially and fully etherified polyols.

Other objects of this invention will be apparent from the following detailed description and claims. In this description and claims all proportions are by weight unless otherwise indicated.

In accordance with one aspect of this invention, the reaction of a polyhydric alcoholate and an organic chloride is effected in dimethyl sulfoxide. It is found that the reaction takes place easily in this medium and that substantial quantities of fully etherified product can be obtained in a single step.

The use of dimethyl sulfoxide as the solvent medium yields unexpected results not only in the production of fully etherified products but also in the production of partial ethers of polyhydric alcohols. Here its use makes it possible to obtain the partial ethers quickly, under mild reaction conditions and in the absence of the large excesses of the chloride and alkali metal hydroxide which are characteristic of the process described in the Krey and Raichle patent mentioned above. Furthermore, in the production of the partial ethers the high rates of reaction are maintained in the presence of added water, over and above the water of reaction produced in the formation of the alcoholate. Thus, in the production of triethers of pentaerythritol dilution of the dimethylsulfoxide with up to about ¼ its weight of water has little if any adverse effect, while in the production of the diethers (using about 2 moles of the chloride and 2 moles of NaOH per mole of pentaerythritol) it is preferred to dilute the dimethyl sulfoxide with about ½ its weight of water. Even when the amounts of halide and alkali metal hydroxide are stoichiometrically sufficient to yield only the partial ethers, the presence of the dimethyl sulfoxide promotes etherification to such an extent that appreciable amounts of the fully etherified product are produced.

The invention has thus far found its greatest utility in the manufacture of ethers of pentaerythritol as shown in the following examples:

EXAMPLE I

Pentaerythritol was mixed with dimethyl sulfoxide and flake sodium hydroxide, in the proportion of 6 gram moles of NaOH and 600 ml. (654 grams) of the dimethyl sulfoxide per gram mole of the pentaerythritol. The mixture was heated to 90° C. and maintained at this temperature, all while stirring for 2 hours. To the resulting mixture of sodium pentaerythritolate there was then added allyl chloride dropwise over a period of one hour while the reaction temperature was maintained at 70° C. with stirring until 4.4 moles of the allyl chloride had been added per mole of pentaerythritol. The mixture was stirred for another 2 hours at 70° C. and then cooled. Water (0.6 liter per gram mole of pentaerythritol) at room temperature was then added and, after filtration, the mixture was allowed to separate into two immiscible layers. The lower, aqueous layer contained the dimethyl sulfoxide. The upper non-aqueous layer was flash distilled to give 110.5 gm. of product (boiling at 105° C. at a pressure of 400 microns HgA). Analysis of this product cut by gas chromatography (on sucrose octaacetate) indicated that it contained 96% pentaerythritol tetraallyl ether and 4% pentaerythritol triallyl ether. This analysis along with the weight of the product cut indicated that 75% of the pentaerythritol had been converted to such ethers.

EXAMPLE II

This example illustrates the production of a partial ether of a polyhydric alcohol by the use of limited proportions of the alkali metal hydroxide insufficient to form the complete salt of the polyhydric alcohol, and correspondingly limited proportions of the organic chloride.

Pentaerythritol, dimethyl sulfoxide and flake sodium hydroxide were mixed in the proportion of 3.2 gram moles of the sodium hydroxide, and 400 ml. (436 grams) of the dimethyl sulfoxide, per gram mole of the pentaerythritol. The mixture was stirred and heated at 80° C. for one hour. Thereafter allyl chloride was added dropwise to the stirred mixture, maintained at 70° C., until 3 moles of allyl chloride had been added per mole of pentaerythritol. This addition took one hour, and the stirred mixture was kept at 70° C. for an additional one hour thereafter, then cooled and diluted with water as in Example I. Analysis as in Example I showed that the non-aqueous layer contained 78% of the triallyl ether of pentaerythritol, 20% of the tetraallyl ether and only 1% of the diallyl ether and that 78% of the pentaerythritol had been converted to such ethers.

Polyhydric alcohols generally are suitable feedstocks, including especially those having a quaternary carbon atom bonded to at least three methylol groups; advantageously all the hydroxyl groups should be primary if high yields of fully etherified product are to be formed. Especially suitable are polymethylolalkanes such as trimethylolethane, trimethylolpropane, and trimethylolbutane and substituted trimethylolalkanes such as trimethylolphenylmethane. Glycols, e.g. ethylene and neopentyl glycols, are suitable; 1,2-propylene glycol gives especially high yields of diether. Functional substituents which will materially affect the reaction should be absent.

Instead of allyl chloride, primary aliphatic or phenyl substituted aliphatic chlorides may be used such as alkyl halides like methyl chloride, ethyl chloride, butyl chloride, octyl chloride or dodecyl chloride; other unsaturated chlorides wherein the unsaturation is in other than the $\alpha$–$\beta$ position such as the alkenyl chlorides, e.g., methallyl chloride or crotyl chloride; or nonvicinal polychlorides such as tetramethylene dichloride, 1,3-butylene dichloride, 1,6-dichlorooctane etc.; phenylalkyl or alkylene mono and polychlorides, e.g. benzyl chloride, 1-phenyl-4-chlorobutene-2, phenyl ethyl chloride etc. It is preferred that the halide be free of such other functional groups as may materially affect the reaction.

Alkali metals may be used such as sodium or potassium. Sodium hydroxide is effective and is preferred. As illustrated in Examples I and II, the alcoholate may be formed first in the process and this may be done by reacting the alkali metal hydroxide with the polyhydric alcohol, preferably in the presence of the dimethyl sulfoxide. The alcoholate may also be formed in the presence of the organic halide, as illustrated in Example III. Of course, in these reactions, water of reaction is produced, and becomes part of the reaction medium. A significant aspect of the invention is the employment of alkali hydroxide, e.g. sodium hydroxide, directly in the presence of the alcohol and the organic halide without the necessity of resorting to a preliminary step in which the alcoholate is formed with the water of reaction then being removed before reacting the alcoholate with the organic halide. This simplifies the reaction sequence and renders the operation less costly than in the prior art, which has not recognized that by the employment of the sulfoxide solvent of the instant invention such simplification was possible along with the attainment of a more rapid reaction rate and the production of substantial quantities of fully etherified product.

In place of the dimethyl sulfoxide which is preferred, there may be used other dihydrocarbyl sulfoxides particularly di-lower alkyl sulfoxides such as diethyl sulfoxide, dipropyl sulfoxide, methyl ethyl sulfoxide, diethenyl sulfoxide, ethyl ethenyl sulfoxide, di-n-butyl sulfoxide, tetramethylene sulfoxide (2,3,4,5 - tetrahydrothiophone - 1-oxide), etc. Other materials may be present in the sulfoxide reaction medium. Thus, as pointed out above, the process work efficiently even where there is present water of reaction as well as added water. Drying agents, such as potassium carbonate or excess sodium hydroxide may be present and will function to physically bind some or all of this water. Other solvents which may be present, in minor proportions, are, for example, diethyl ether, dioxane, etc.

In carrying out the reaction, the proportions of chloride may be, for example, such as to provide a ratio of reactive chloride groups to alcohol hydroxyl groups in the range of about 1:1 to 2:1, preferably about 1.5:1 to 2:1 when production of fully etherified product is desired. For the making of partial ethers containing one unetherified hydroxyl group, smaller amounts of chloride (e.g. in the case of pentaerythritol about 1.0 to 1.1 reactive chloride group per ether group to be formed) may be employed.

The amount of sodium hydroxide, or other alkali metal hydroxide, is desirably in the same molar range as the amount of reactive chloride groups given above. Preferably, the amount of alkali metal hydroxide will be such as to provide about one molecule of such hydroxide per reactive halide atom.

The amount of dimethyl sulfoxide may be, for example, about 40 to 70%, preferably about 45 to 50% of the total reaction mixture.

The temperature of the etherification is advantageously in the range of about 70 to 100° C., which range is lower than that characteristic of the prior art which has not recognized the markedly higher reactivity of reaction systems employing the sulfoxide media. Superatmospheric or subatmospheric pressures may be employed but are not needed. If there is an initial step of forming the alkoxide or alcoholate it is advantageously carried out at a temperature within the range of about 80 to 160° C.; for the formation of the pentaerythritol alcoholates the temperature is advantageously below 110° C.

EXAMPLE III

This example illustrates another method of combining the reactants. Here the pentaerythritol was reacted with butyl chloride in the presence of sodium hydroxide, without any preliminary formation of alcoholate.

Five gram moles of flake sodium hydroxide were mixed in 400 ml. of dimethyl sulfoxide with 4.4 gram moles of n-butyl chloride. To this blend there was added a solution of one (1) gram mole of pentaerythritol in 600 ml. (654 grams) of dimethyl sulfoxide and the mixture was stirred for 6 hours at 90° C. The mixture was then cooled to room temperature and diluted with 200 gm. of water and allowed to separate into two layers. The upper, non-aqueous layer was flash distilled at a pressure of 180 microns HgA (124° C.); analysis of this product cut indicated that it contained 52.3% tetrabutyl ether of pentaerythritol, 47.5% of the triether of pentaerythritol and 0.2% of the diether of pentaerythritol and that 70.9% of the pentaerythritol has been converted to said ethers.

When a blend containing partially etherified polyhydric alcohol is obtained, the components may be separated and recovered in a particularly effective manner by dissolving the blend in a hydrocarbon solvent, such as an aliphatic hydrocarbon, e.g. hexane, pentane or octane and then extracting the solution with dimethyl sulfoxide which, we have found, preferentially dissolves the less-etherified portion of the product. These solvents may then be removed from the fractions by simple distillations. With blends containing major proportions of the less etherified material, the latter may be conveniently recovered by dissolving the blend in dimethyl sulfoxide and extracting the full ether therefrom by treatment with hexane. Here, as above, the solvents may be removed from the individual ethers by simple distillation. In one run, a mixture containing 87% tetraallyl ether of pentaerythritol and 13% of triallyl ether of pentaerythritol, obtained in the manner described above, was dissolved at room temperature in 4.35 times its weight of hexane and then extracted at room temperature with 0.46 times its weight of dimethyl sulfoxide. On distillation of the extracted hexane, a pentaerythritol tetraallyl ether of 98.5% purity was obtained. The same method may be employed for separating the tributyl ether of pentaerythritol from the corresponding dibutyl ether.

Another aspect of this invention relates to the use of the dialkyl sulfoxide as an improved solvent in the preparation of ethers of monohydric alcohols, particularly primary monohydric alcohols, by reaction of such alcohols, as their alkoxides or in the presence of substantial quantities of alkali metal hydroxides, with primary chlorides. Among the monohydric alcohols which may be used as butanol, dodecanol, cyclohexanol, isopropyl alcohol, n-propanol, pentanol, hexanol, heptanol, octanol and cyclopentanol. It is preferred that the alcohol be free of such other functional groups as will materially affect the reaction. The chloride may be, for example, allyl chloride; alkyl chlorides like butyl chloride, octyl chloride, dodecyl chloride; other unsaturated chlorides wherein the unsaturation is in other than the $\alpha$–$\beta$ position, such as methallyl chloride, crotyl chloride or 1-phenyl, 4-chlorobutene-2; or polychlorides such as tetramethylene dichloride. It is preferred that the halide be free of such other functional groups as may materially affect the reaction. The proportions of ingredients and the conditions of reaction to be used in this embodiment may be the same as those described above in connection with the etherification of polyhydric alcohols. The use of the dialkyl sulfoxide solvent in this aspect of the invention makes it possible to obtain very high yields of the ether in relatively short periods of time under mild conditions and without the necessity of employing a preliminary step in which an alkali metal alcoholate is pre-formed. This is illustrated in the following example.

EXAMPLE IV

One gram mole of n-butanol, 1.2 gram moles of sodium hydroxide flake and 300 ml. (327 grams) of dimethyl sulfoxide were mixed and heated, while stirring at 100° C. for 2.5 hours to produce a yellowish mixture containing sodium butylate and unreacted sodium hydroxide. 1.2 gram moles of n-butyl chloride were then added dropwise while the temperature of the mixture was maintained at 90 to 100° C. for 1.0 hour. The mixture was held at this temperature for a further 1 hour after the addition was completed. After cooling the mixture to room temperature, 400 ml. water was added and the two resulting liquid layers were separated. The upper non-aqueous layer was recovered and flash distilled at atmospheric pressure to produce a cut containing 83.7% dibutyl ether and 11.6% butanol. The yield of the dibutyl ether was 68.0%; 15.5% of butanol was recovered, unreacted. When the gram moles of sodium hydroxide and n-butyl chloride per mole of pentaerythritol was increased to 1.5 and the salt formation time increased to 7 hours, a product cut containing 92.1% dibutyl ether and 3.6% butanol was obtained. The yield of dibutyl ether in this case was 95.1%; 5% of the butanol was recovered, unreacted.

EXAMPLE V

Example IV was repeated utilizing as the solvent di-n-butyl sulfoxide. A 43% yield of di-n-butyl ether was obtained.

EXAMPLE VI

Example IV was repeated using tetramethylene sulfoxide (2,3,4,5-tetrahydrothiophone-1-oxide) as the solvent. A 66% yield of di-n-butyl ether was obtained.

EXAMPLE VII

The following example illustrates the less satisfactory results obtained by employing a process of currently available technology as compared with the improved process of the present invention as illustrated in Example IV above.

Butanol (250 grams) and sodium hydroxide (1.5 gram moles) were mixed, heated to 95–100° C. and stirred at this temperature for 4 hours. Butyl chloride (1.0 gram mole) was added to the reaction mixture and the reaction mixture was held at 100° C. for 10 hours. A 61% yield of dibutyl ether (based on n-butyl chloride) was obtained and 15% of the n-butyl chloride was recovered unreacted.

EXAMPLE VIII

The following illustrates the employment of the process of the invention in producing a high yield of the tributyl ether of trimethylolpropane under reaction conditions which are milder than those of prior art processes which have characteristically produced only the dibutyl ether.

Trimethylolpropane was mixed with dimethyl sulfoxide and flake sodium hydroxide, in the proportion of 3.3 gram moles of NaOH and 600 mls. (654 gms.) of dimethyl sulfoxide per gram mole of trimethylolpropane. The mixture was heated to 95° C. and maintained at this temperature, with stirring for 3 hours. To the resultant mixture there was added n-butyl chloride dropwise over a period of 1 hour while the reaction mixture was maintained at 95° C. with stirring until 3.3 moles of n-butyl chloride had been added per mole of trimethylolpropane. The mixture was stirred for another 4 hours at 95° C. and cooled. Water (0.6 litre per gram mole of trimethylolpropane) at room temperature was added and, after filtration, the mixture was allowed to separate into two immiscible layers. The upper, non-aqueous layer was flash distilled to yield product. Analysis of this product indicated that it contained 18% of the dibutyl ether and 82% of the tributyl ether with these two products accounting for 90% of the charged trimethylolpropane.

It is to be understood that the foregoing detailed description is given merely by way of illustration and that many variations may be made therein without departnig from the spirit of our invention.

The embodiments of the invention in which an exclusive property or privilege is claimed are defined as follows:

1. A process for separating a blend comprising tetraallyl and triallyl ethers of pentaerythritol which comprises dissolving one part of weight of said blend in 4.35 parts by weight of a liquid hydrocarbon selected from the group consisting of hexane, pentane and octane, extracting the resulting hydrocarbon solution with 0.46 part by weight of dimethyl sulfoxide to form a hydrocarbon-containing raffinate and a dimethyl sulfoxide-containing extract, and recovering the tetraalkyl ether from the raffinate.

References Cited

UNITED STATES PATENTS 3,428,693 2/1969 Prosser _____ 260—615 R
3,431,308 3/1969 Zimmerman et al. __ 260—615 R HOWARD T. MARS, Primary Examiner U.S. Cl. X.R.

260—614 R